May 26, 1936. K. S. HOWARD 2,042,177
RAILWAY MOTOR TRUCK
Filed July 6, 1931 3 Sheets-Sheet 1

INVENTOR
Karl S. Howard
BY
Rodney Bedell
ATTORNEY

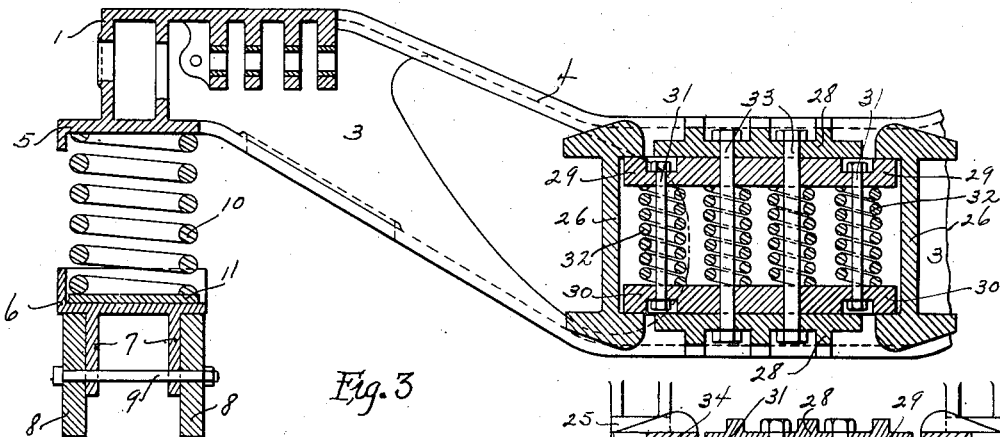
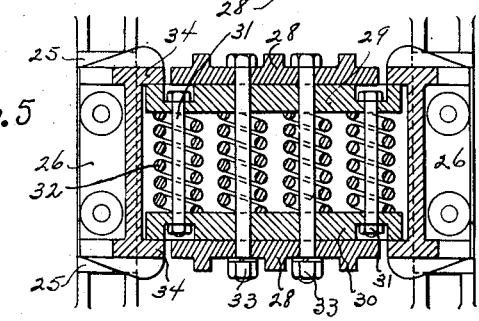
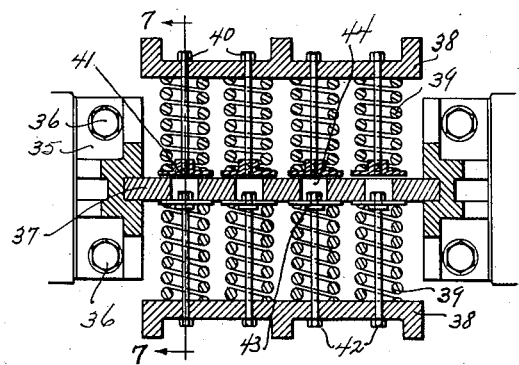
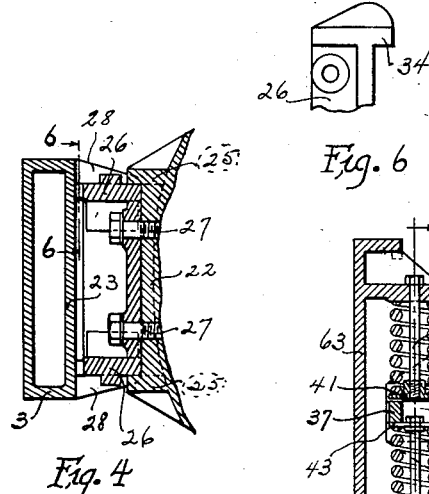
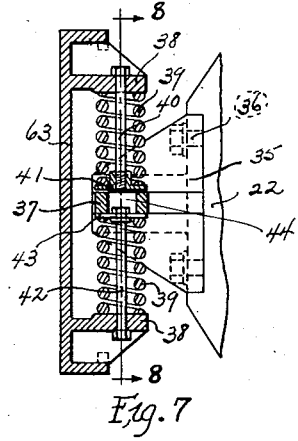

May 26, 1936.　　　K. S. HOWARD　　　2,042,177
RAILWAY MOTOR TRUCK
Filed July 6, 1931　　　3 Sheets-Sheet 3

INVENTOR
Karl S. Howard
BY Rodney Bedell
ATTORNEY

Patented May 26, 1936

2,042,177

UNITED STATES PATENT OFFICE 2,042,177

RAILWAY MOTOR TRUCK

Karl S. Howard, St. Louis, Mo., assignor to General Steel Castings Corporation, Granite City, Ill., a corporation of Delaware Application July 6, 1931, Serial No. 548,997

15 Claims. (Cl. 105—139)

The invention relates to means for supporting the motor frames or housing of motor car trucks, and particularly to the type wherein the frame or housing of an electric motor is swivelled at one end on the wheel axle to which the motor is gear connected, and which is resiliently supported at the opposite end on a transverse member of the truck frame.

It is the present practice in motor truck design to provide a yielding support for the motor on the truck transom and also to provide for the application or removal of the motor either from above or below the truck and particularly from below, without removing the truck from its position under the car body and without removing the wheels and axles.

On some previous arrangements the motor housing has been provided with vertically spaced lugs for mounting the spring suspension device therebetween, and lugs or brackets have been provided on the truck transom to engage the spring suspension device to support the motor. When the truck is designed so as to remove the motor from either above or below, the lugs or brackets on the transom are arranged so as to be laterally movable to permit the vertical swinging of the motor in either direction. In the usual truck construction there is insufficient clearance for laterally applying or removing the spring suspension device with the motor in position and, therefore, the spring suspension device is placed in position between the vertically spaced lugs on the motor housing before the motor is placed in position on the truck.

The main object of the present invention is to provide a novel spring suspension device which has all the advantages of the above construction but which provides for mounting the spring suspension device in position on the truck transom before the motor is applied, or on the motor housing so that the spring suspension device need be moved but a short distance laterally to provide for its removal for repair. Preferably the construction provides for laterally movable brackets on the motor housing instead of on the truck transom, to engage or carry the spring suspension device and to support the motor from the truck transom. The preferred structure provides for vertical movement of the motor with the main supporting members of the spring suspension device in position on the truck transom.

A further object is to simplify the construction of the truck transom by casting the motor supporting elements integral therewith and by providing for a minimum amount of machining.

Another object of the invention is to provide means for holding or locking the spring suspension device or its follower in position on the truck transom so as to prevent displacement relative to the laterally removable brackets on the motor housing.

My invention consists in all the novel features hereinafter disclosed and illustrated by the preferred forms shown in the accompanying drawings.

In the drawings:

Figure 3 is a detail section along the line 3—3 of Figure 1.

Figure 4 is a detail section along the line 4—4 of Figure 1.

Figure 5 is a detail section along the line 5—5 of Figure 1.

Figure 6 is a detail view along the line 6—6 of Figure 4.

Figures 1, 2:
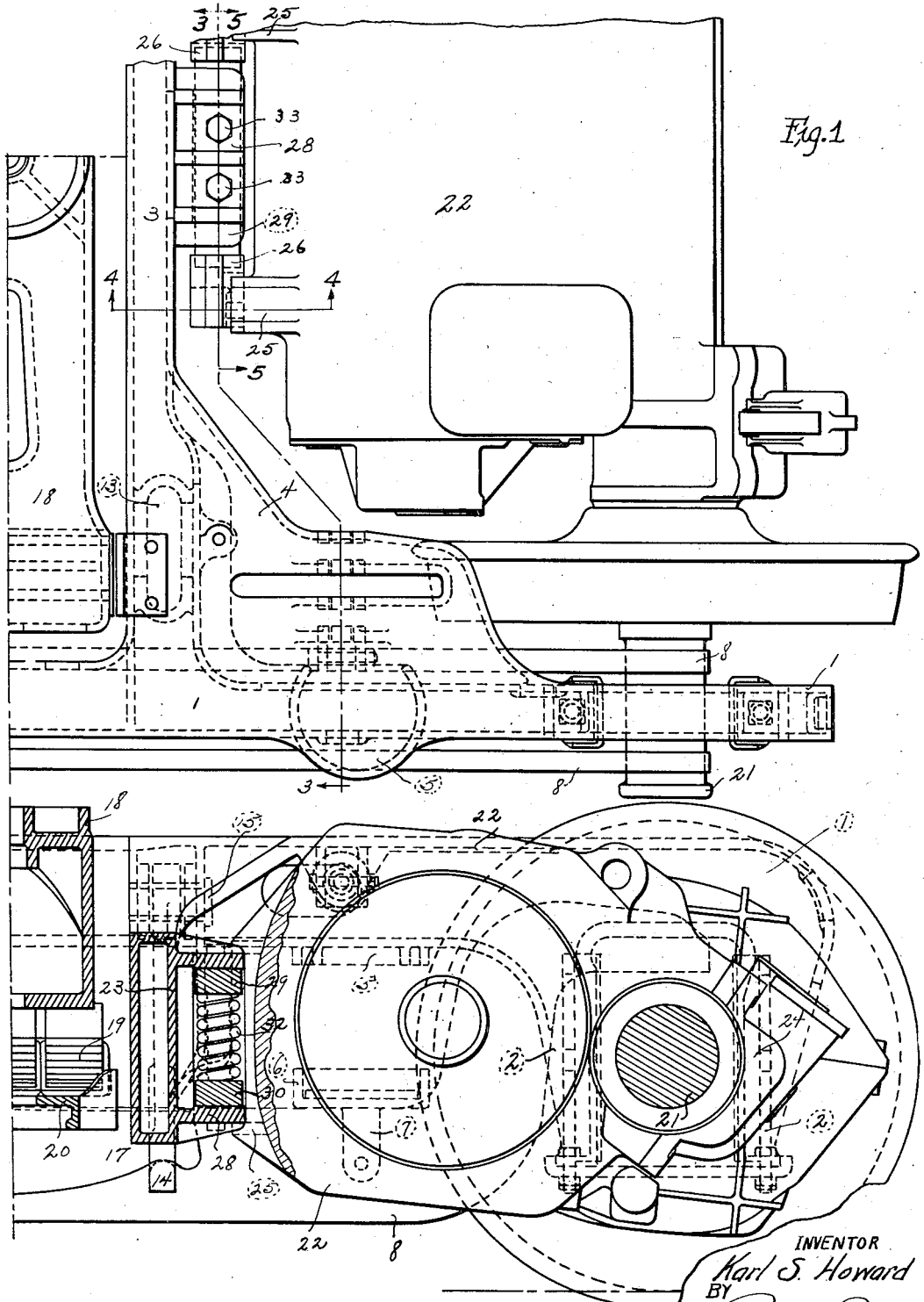
Figure 1 is a partial top view of a motor truck showing my invention applied thereto.
Figure 2 is a partial side view of a motor truck being sectioned in part for clearer illustration.

Figure 7 corresponds to a sectioned portion of Figure 2 but illustrates a modified structure and is taken along the line 7—7 of Figure 8.

Figure 8 is a vertical section along the line 8—8 of Figure 7.

Figure 9 corresponds to Figure 7 but illustrates another modification and is taken along the line 9—9 of Figure 11.

Figure 10 is a similar section along the line 10—10 of Figure 11.

Figure 11 is a vertical section along the line 11—11 of Figure 10.

While applicable to other types of power driven car trucks, the present improvement is preferably shown applied to a car truck in which means is provided for permitting a limited vertical movement of the axle and the motor relative to the truck frame, to compensate for shock caused by road bed and rail variations.

In the preferred form of my invention (Figs. 1-6 inclusive) car truck frame 1 is provided with pedestal jaws 2 for receiving axle journal boxes, not shown, and an integral, transverse transom member 3 reinforced by the gusset member 4. Frame 1 is provided with spring caps 5. Spring seats 6 have flanged portions 7 which are bolted to the equalizer bars 8 by suitable means such as bolts 9. Springs 10 and bearing plates 11 are interposed between seats 6 and caps 5 thereby permitting vertical movement of the frame. Transoms 3 are provided with suitable slots 13 through which are suspended swinging hangers 14 by means of pivots 15. Hangers 14 support cross bars 17. Truck bolsters 18, bolster springs 19 and spring plank 20 are supported by cross bars 17 thereby permitting transverse movement of the bolster in the frame.

An electric motor is mounted on and geared to one of the wheel axles 21 and, if desired, each axle may be provided with a motor.

As shown, the motor housing 22 is interposed between the wheel axle and the adjacent side wall 23 of the truck transom and at one end or side is swivelled on said axle and removably connected thereto by a suitable axle cap 24. At its opposite end or side the motor housing is preferably provided with suitable projecting portions or members 25 extending longitudinally of the truck. Supported brackets 26 are detachably mounted on said projections 25 and are laterally slidable into and out of operative positions thereon, being suitably secured in operative position by bolts 27.

Supporting brackets 28 are preferably provided as integral parts of side wall 23 of transom member 3 to cooperate with brackets 26 through a suitable spring suspension unit. However, brackets 28 may be constructed so as to be detachable from or riveted to the transom member.

The spring suspension unit comprises upper and lower spring retaining bars 29 and 30 having recessed portions into which heads and nuts of bolts 31 are fitted, said bolts being used as suitable means for connecting said bars together and also for retention of springs 32 disposed between said bars.

This suspension unit is preferably disposed intermediate its ends between the upper and lower brackets 28, being detachably secured thereto by means of bolts 33, and having its opposite ends engaged above and below by seat like portions 34 of brackets 26 when the brackets 26 are in operative position on the motor housing.

When brackets 26 are in operative positions and cooperating with adjacent brackets 28 through the spring bars 29 and 30, said bars are secured against horizontal or vertical displacement. Any strain caused in the motor supporting brackets 26 and 28, because of the tendency of the wheel axle to rock in vertical planes when passing over irregularities in the track is relieved by the springs 32 permitting limited vertical swinging movement of the motor housing relative to the frame.

It can also be readily seen that by the removal of bolts 27, brackets 26 can be slid laterally away from each other and out of operative positions along projections 25 of motor housing 22 and unobstructed vertical movement, either upwardly or downwardly, of the motor housing is thereby permitted giving access thereto for minor adjustment or repair and with the further removal of axle cap 24, the motor may be entirely removed from the truck either from above or below without necessitating the removal of other parts of the truck frame.

Figures 7 and 8 illustrate a modified form of my invention in which a pair of laterally adjustable brackets 35 are detachably mounted in a recessed portion of motor housing 22 by suitable means such as by bolts 36. Brackets 35 are preferably provided with grooved portions for receiving the ends of horizontal bar 37.

Projecting transverse brackets 38 are preferably provided as integral portions of transom member 63, but may be detachable from or riveted thereto if desired.

Horizontal bar 37 is disposed centrally between upper and lower brackets 38 and is preferably retained in position by means of upper and lower springs or series of springs 39 between said brackets and bar and detachably secured to the former by means of bolts 40, threaded members 41, bolts 42 and members 43. Bar 37 is provided with suitable holes 44 for receiving the heads of bolts 42, thereby retaining bar 37 from horizontal displacement.

Obviously, by removal of bolts 36, brackets 35 can be slid laterally away from each other in the recessed portions of motor housing 22 and out of operative positions permitting unobstructed vertical swinging movement of said housing and giving ready access thereto for adjustment or repair.

Figures 9, 10, and 11 illustrate another modification of my invention wherein a pair of laterally adjustable brackets 45 are detachably mounted on the motor housing 22 and cooperate with a single bracket 46 preferably provided as an integral part of the transom 73 and adjacent to the motor housing. Bracket 46, if desired, may be of such construction as to be detachable from or riveted to the transom 73 without causing departure from the invention.

Bracket 45 consists of a stout casting having upper and lower projecting seat like portions 47 above and below which are disposed upper and lower springs or series of springs 48, detachably secured thereto by means of bolts 49 and threaded members 50, which when in operative positions engage opposite ends of horizontal bar 51 secured intermediate its ends to bracket 46 by bolts 52.

By removal of bolts 53, brackets 45 can be slid laterally away from each other along the recessed portion of housing 22 to clear the bar 51, thereby permitting unobstructed vertical swinging movement of housing 22 either upwardly or downwardly from its normal position to give access thereto for adjustment or repair. Springs 48 may be compressed by tightening bolts 49 to further facilitate the lateral adjustment of the brackets 45 to disengage the ends of bar 51.

While a yielding suspension unit is more desirable for connection and supporting the free end of a motor, mounted on the wheel axle, on the transom member, a rigid suspension unit of suitable construction may be employed.

Obviously various features and details of the motor truck frame which are not essential to my invention as well as modifications in the means of supporting a motor frame which is swivelled to the wheel axle as herein disclosed, may be changed without departure from the scope of my invention.

What is claimed is:

1. In a motor truck, a truck frame including a transom, a wheel axle, an interposed motor housing mounted at one end on the wheel axle and having projecting members adjacent said transom on which are mounted laterally adjustable brackets which are bolted thereto in operative positions, upper and lower brackets projecting from the transom side wall adjacent to the motor housing, horizontal spring retaining bars disposed transversely between said transom brackets and detachably bolted thereto and having their ends engaging said motor housing brackets when said latter brackets are in operative positions to support said motor housing and resist vertical movement of the latter in either direction.

2. In a motor truck, a truck frame including a transom member, a wheel axle, an interposed motor housing mounted at one end on said axle, laterally movable brackets mounted on said housing, cooperating supporting brackets projecting from said transom member, and a yielding device mounted between said transom brackets independently of said housing brackets and with opposite portions engaging said housing brackets to support said motor housing and resist the vertical movement thereof in either direction.

3. In a motor truck, a truck frame including a transom member, a wheel axle, an interposed motor mounted at one end on said axle and having portions adjacent the transom member, a pair of supported brackets mounted on said portions, supporting means including spring structure and a transversely extending member engaged at its ends by said brackets, a pair of supporting brackets extending outwardly along the transom adjacent to the motor housing, portions of said supporting brackets being disposed above and below and secured to said supporting means intermediate its ends to hold the latter against horizontal displacement, and said supported brackets being laterally adjustable into and out of operative position, the former position for supporting the motor housing and resisting vertical movement of the latter in either direction and the latter position to permit unobstructed vertical movement of the motor housing in opposite directions from its normal position.

4. In a motor truck, a truck frame having a transverse transom, a wheel axle, an interposed motor housing mounted at one end on said axle, a pair of laterally spaced supported brackets mounted on the opposite end of said motor housing, a supporting device having a transversely extending element engaging near its ends with said brackets, a pair of vertically spaced supporting brackets projecting transversely from the transom and adjacent to said motor housing, portions of said supporting brackets being disposed above and below and engaging with said device, and said supported brackets being laterally movable into and out of operative position, said supported brackets in the operative position supporting the motor housing and resisting the vertical movement of said housing in either direction and said supported brackets in the inoperative position permitting unobstructed vertical movement of the motor housing from its normal position and free of said device.

5. In a motor truck, a truck frame including a transom, a wheel axle, an interposed motor housing mounted at one end on the wheel axle, laterally spaced detachable brackets mounted on the opposite end of said motor housing, vertically spaced brackets projecting from said transom adjacent said housing, upper and lower springs mounted on said vertically spaced brackets and between them, and a horizontal bar located between said upper and lower springs, the end portions of said bar engaging said laterally spaced brackets to support said motor.

6. In a motor truck, a truck frame having a transverse transom, a wheel axle, an interposed motor housing movably mounted at one end on said axle, laterally spaced detachable brackets slidably mounted on the opposite end of said housing, said housing being adapted to partly receive said brackets, vertically spaced elements projecting from said transom adjacent to said housing, upper and lower springs located between said elements, a substantially horizontal member disposed between said springs, and means for securing said springs to said elements and positioning said member, said member being adapted to partly receive a portion of said means, the end portions of said member engaging said laterally spaced brackets to support the motor housing, and said springs serving to resist the vertical movement of the housing in either direction.

7. In a motor truck, a truck frame including a transom member, a wheel axle, an interposed motor housing mounted at one end on the wheel axle and having a pair of laterally removable supported brackets detachably mounted thereon adjacent the transom member, a pair of upper and lower brackets on the transom wall adjacent said motor housing, a suspension unit comprising a horizontal member secured between upper and lower springs and disposed between and detachably mounted intermediate its ends on said transom brackets to prevent horizontal displacement of said unit and having its ends engaging recessed portions of said supported brackets to support the motor housing, said supported brackets when in one position cooperating with said unit to resist vertical movement of the motor housing in either direction and when in another position permitting unobstructed vertical movement of the motor housing in opposite directions from its normal position.

8. In a motor truck, a truck frame including a transom member, a wheel axle, an interposed motor housing mounted at one end on the wheel axle and having a pair of laterally removable supported brackets detachably mounted thereon adjacent to the transom member, a means for securing said brackets into operative position, a cooperative supporting bracket on the transom member adjacent to the motor housing, a horizontal bar extending parallel to the transom member and detachably mounted intermediate its ends thereon and having its opposite ends engaged between a series of upper and lower springs held in recessed portions of the first mentioned brackets and secured thereto, said supported brackets when in one position cooperating with said springs and bar to resist vertical movement of the motor housing in either direction and when in another position permitting unobstructed vertical movement of the motor housing in opposite directions from its normal position.

9. In a motor truck, a truck frame including a transom, a wheel axle, an interposed motor housing mounted at one end on the wheel axle, spaced brackets mounted on the opposite end of said motor housing and each provided with spring members secured thereto, and a bar extending between and supporting said spring members and secured to said transom.

10. In a motor truck, a truck frame including a transom, a wheel axle, a motor housing between said axle and transom and having one end mounted on said axle, a bracket slidably mounted on the other end of said housing, cooperating structure projecting from said transom, upper and lower yielding devices mounted on said structure, a rigid member carried by said yielding devices and projecting outwardly therefrom to engage said bracket to support said motor housing against vertical movement in either direction.

11. In a motor truck, an axle, a transom, a motor housing with a portion mounted on said axle and a part adjacent said transom, a supported member, yielding means supporting said member from said transom, and an element mounted on said housing and movable to a position to engage said supported member to effect yielding support of said housing on said transom, said element being also movable to a position vertically clear of said member to permit said housing to move upwardly and downwardly relative to said transom and said yielding means without affecting the assembly of said yielding means and said transom.

12. In a motor truck, an axle, a transom, a motor housing mounted on said axle and having a portion adjacent said transom, brackets movably mounted on said portion and each having vertically opposing jaws, and yielding means mounted on said transom independently of said housing, said means having springs and spring engaging members and said brackets being movable to positions to vertically interlock with said members to effect yielding support of the referred to portions of said housing on said transom, said brackets being also movable to positions vertically clear of said members to permit movement of said housing independently of said transom and said spring means.

13. In a motor truck, a truck frame including a transom, structure carried by said transom and including yielding means, a wheel axle, a motor housing mounted at one end on said axle and having brackets at the opposite end detachably secured thereto at the sides of said structure and arranged to be moved from positions where they vertically overlap said structure into positions where they will clear said structure when moved vertically, without disassembly of said yielding means and the remainder of said structure.

14. In a railway truck, a truck frame including a transom, a wheel axle, a motor housing between said axle and transom and having one end carried by said axle, a bracket member slidably mounted on the other end of said housing, a bracket member projecting from said transom and vertically disaligned from said first-mentioned member, upper and lower yielding devices mounted on one of said members, a rigid follower between said devices and projecting laterally therefrom to engage the other of said members to support said motor housing.

15. In a motor truck, a truck frame including a transom, a bracket thereon, a motor including a housing, a bracket thereon, said brackets being disaligned vertically, yielding elements assembled on one of said brackets, and follower structure co-operating with said elements in forming a yielding connection between said brackets to resist the vertical movement of said motor relative to said frame, the bracket on said housing being slidable thereon transversely of the truck away from the bracket on said transom and out of functioning position to release said connection, without disassembling said yielding elements, to permit the motor to be dropped from normal operating position.

KARL S. HOWARD.